US012578494B2

(12) United States Patent
Kameshima

(10) Patent No.: US 12,578,494 B2
(45) Date of Patent: Mar. 17, 2026

(54) CAPACITANCE SENSOR AND METHOD FOR PRODUCING CAPACITANCE SENSOR

(71) Applicant: Fujikura Ltd., Tokyo (JP)

(72) Inventor: Takashi Kameshima, Sakura (JP)

(73) Assignee: Fujikura Ltd., Tokyo (JP)

( * ) Notice: Subject to any disclaimer, the term of this patent is extended or adjusted under 35 U.S.C. 154(b) by 157 days.

(21) Appl. No.: 18/277,178

(22) PCT Filed: Mar. 3, 2022

(86) PCT No.: PCT/JP2022/009181
§ 371 (c)(1),
(2) Date: Aug. 14, 2023

(87) PCT Pub. No.: WO2022/191036
PCT Pub. Date: Sep. 15, 2022

(65) Prior Publication Data
US 2024/0094424 A1 Mar. 21, 2024

(30) Foreign Application Priority Data
Mar. 9, 2021 (JP) ................................. 2021-037743

(51) Int. Cl.
*G01V 3/08* (2006.01)
(52) U.S. Cl.
CPC .................................... *G01V 3/088* (2013.01)
(58) Field of Classification Search
CPC ........................................... G01V 3/088
USPC ........................................................ 345/173
See application file for complete search history.

(56) References Cited

U.S. PATENT DOCUMENTS

| | | | | |
|---|---|---|---|---|
| 2011/0104389 A1* | 5/2011 | Bryan-Brown | ........ | B82Y 10/00 427/510 |
| 2011/0279387 A1* | 11/2011 | Kim | ........................ | G06F 3/044 216/13 |
| 2017/0139511 A1* | 5/2017 | Ohsawa | .................. | G06F 3/045 |
| 2018/0275797 A1* | 9/2018 | Mitsuhashi | ........... | G06F 3/0445 |

(Continued)

FOREIGN PATENT DOCUMENTS

| | | |
|---|---|---|
| JP | 6167103 B2 | 7/2017 |
| JP | 2020123258 A | 8/2020 |

(Continued)

OTHER PUBLICATIONS

International Search Report issued in corresponding International Application No. PCT/JP2022/009181, dated Jun. 7, 2022 (3 pages).

*Primary Examiner* — Mark Edwards
(74) *Attorney, Agent, or Firm* — Osha Bergman Watanabe & Burton LLP

(57) ABSTRACT

A capacitance sensor includes a translucent base film, a translucent resist layer disposed on a part of a main surface of the translucent base film and having higher adhesion to a conductive polymer than to the translucent base film, and a translucent electrode including a conductive material containing the conductive polymer and disposed on a surface of the translucent resist layer opposite to a surface of the translucent resist layer on which the translucent base film is disposed. When viewed along a thickness direction of the translucent base film, a region of the main surface of the translucent base film where the translucent resist layer is not disposed surrounds the translucent electrode.

9 Claims, 3 Drawing Sheets

(56)                    References Cited

U.S. PATENT DOCUMENTS

2019/0018521  A1 *    1/2019   Aoshima ............. G06F 3/04164
2020/0177181  A1      6/2020   Nishimura et al.

FOREIGN PATENT DOCUMENTS

WO         2015147323  A1    10/2015
WO         2017111039  A1     6/2017

* cited by examiner

CAPACITANCE SENSOR AND METHOD FOR PRODUCING CAPACITANCE SENSOR

BACKGROUND

Technical Field

The present invention relates to a capacitance sensor and a method for producing a capacitance sensor.

Description of the Related Art

A capacitance sensor that can be used for a touch panel display and the like is known. Patent Literature 1 below discloses a capacitance sensor in which a translucent electrode made of a conductive polymer is provided on a translucent base film. Patent Literature 1 below also discloses that a layer that enhances adhesion between the base film and the conductive polymer may be provided between the base film and the electrode.

Patent Literature 1: JP 6167103 B2

In general, a layer that enhances adhesion tends to be provided on the entire surface of the base film. Therefore, in a case where the layer is provided in the capacitance sensor in Patent Literature 1, the thickness of the entire capacitance sensor tends to increase and the flexibility of the capacitance sensor tends to decrease as compared with a case where the layer is not provided. Meanwhile, there is a case where a portion to which the capacitance sensor is attached is a curved surface, and there is a demand for suppressing the decrease in flexibility from the viewpoint of attachability.

SUMMARY

One or more embodiments provide a capacitance sensor capable of suppressing a decrease in flexibility while increasing adhesion of an electrode, and a method for producing a capacitance sensor.

A capacitance sensor according to one or more embodiments includes a base film having translucency, a resist layer provided on a part of one main surface of the base film, the resist layer having translucency and having higher adhesion to a predetermined conductive polymer than the base film, and an electrode having translucency and made of a conductive material containing the predetermined conductive polymer, at least a part of the electrode being provided on a surface of the resist layer opposite to a surface thereof provided with the base film. When viewed along a thickness direction of the base film, a region of the one main surface of the base film not provided with the resist layer surrounds the electrode.

Also, a method for producing a capacitance sensor according to one or more embodiments includes a resist layer forming process of applying a resin material to a part of one main surface of a base film having translucency to form a resist layer having translucency and having higher adhesion to a predetermined conductive polymer than the base film, and an electrode forming process of applying a conductive material containing the predetermined conductive polymer to at least a part of a surface of the resist layer opposite to a surface thereof provided with the base film to form an electrode having translucency. In the resist layer forming process, the resin material is applied so that, when viewed along a thickness direction of the base film, the resist layer is surrounded by a region of the one main surface of the base film not provided with the resist layer. In the electrode forming process, the conductive material is applied so that, when viewed along the thickness direction of the base film, the electrode is surrounded by the region.

In the capacitance sensor and the method for producing a capacitance sensor, at least a part of the electrode having translucency is attached to the base film via the resist layer. The adhesion between the predetermined conductive polymer contained in the conductive material constituting the electrode and the resist layer is higher than the adhesion between the predetermined conductive polymer and the base film. Therefore, as compared with a case where the resist layer is not provided on the base film, the adhesion between the electrode and the base film can be enhanced. Also, in the capacitance sensor and the method for producing a capacitance sensor, when viewed along the thickness direction of the base film, the region of the one main surface of the base film not provided with the resist layer surrounds the electrode. Therefore, with the capacitance sensor, as compared with a case where the resist layer is provided on the entire surface of the one main surface of the base film, it is possible to suppress a decrease in flexibility at least around the electrode, and it is possible to improve attachability to a curved portion in a device or the like. Further, with the method for producing a capacitance sensor, it is possible to produce the capacitance sensor capable of suppressing a decrease in flexibility while increasing adhesion of the electrode.

The capacitance sensor may further include a shield layer provided in the region and separated from the electrode.

With such a configuration, as compared with a case where the capacitance sensor does not include the shield layer, it is possible to suppress an influence of an external electromagnetic field or the like on the electrode.

In this case, the shield layer may be thicker than the electrode.

With such a configuration, as compared with a case where the shield layer is thinner than the electrode, the difference between the total thickness of the electrode and the resist layer and the thickness of the shield layer can be reduced. Therefore, as compared with a case where the shield layer is thinner than the electrode, the amount of unevenness of a surface of the capacitance sensor on a side of the electrode with reference to the base film can be reduced.

In this case, at least a part of the electrode and a part of the shield layer may overlap with each other in a direction along the one main surface of the base film.

With such a configuration, as compared with a case where the electrode and the shield layer do not overlap with each other in the direction along the one main surface of the base film, it is possible to suppress an influence of an electromagnetic field or the like in the direction along the one main surface of the base film on the electrode.

In the capacitance sensor, the base film may include a main portion provided with the resist layer, and a tail portion connected to the main portion and provided with a terminal electrically connected to the electrode, and the one main surface of the base film in the tail portion may be included in the region.

With such a configuration, since the resist layer is not provided in the tail portion of the base film, as compared with a case where the resist layer is provided in the tail portion, it is possible to suppress a decrease in flexibility of a portion including the tail portion in the capacitance sensor, and it is possible to easily arrange the terminal at a desired position.

The capacitance sensor may further include an over resist layer made of a resin which is same as a resin constituting the resist layer and covering the electrode.

With such a configuration, as compared with a case where the over resist layer is made of a different resin from the resin constituting the resist layer, the difference between the amount of expansion and contraction of the resist layer due to heat and the amount of expansion and contraction of the over resist layer due to heat can be reduced, and cracks caused by expansion and contraction due to heat can be suppressed.

As described above, according to one or more embodiments, provided are a capacitance sensor capable of suppressing a decrease in flexibility while increasing adhesion of an electrode, and a method for producing a capacitance sensor.

BRIEF DESCRIPTION OF THE DRAWINGS

FIG. 2 is an exploded perspective view schematically illustrating the capacitance sensor illustrated in FIG. 1.

DESCRIPTION OF THE EMBODIMENTS

Figure 1:
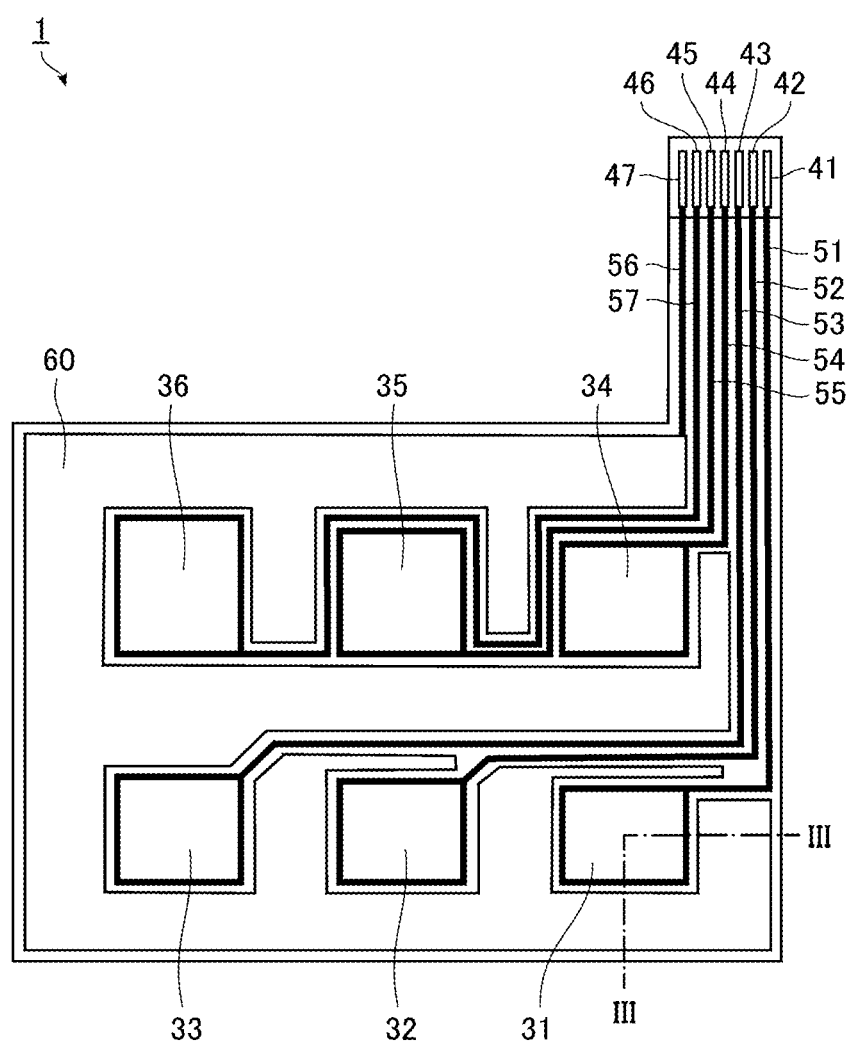
FIG. 1 is a plan view schematically illustrating a capacitance sensor according to one or more embodiments.

Hereinbelow, one or more embodiments of a capacitance sensor and a method for producing a capacitance sensor according to one or more embodiments will be described in detail with reference to the drawings. In the drawings referred to below, dimensions of each member may be changed to facilitate understanding.

Figure 2:
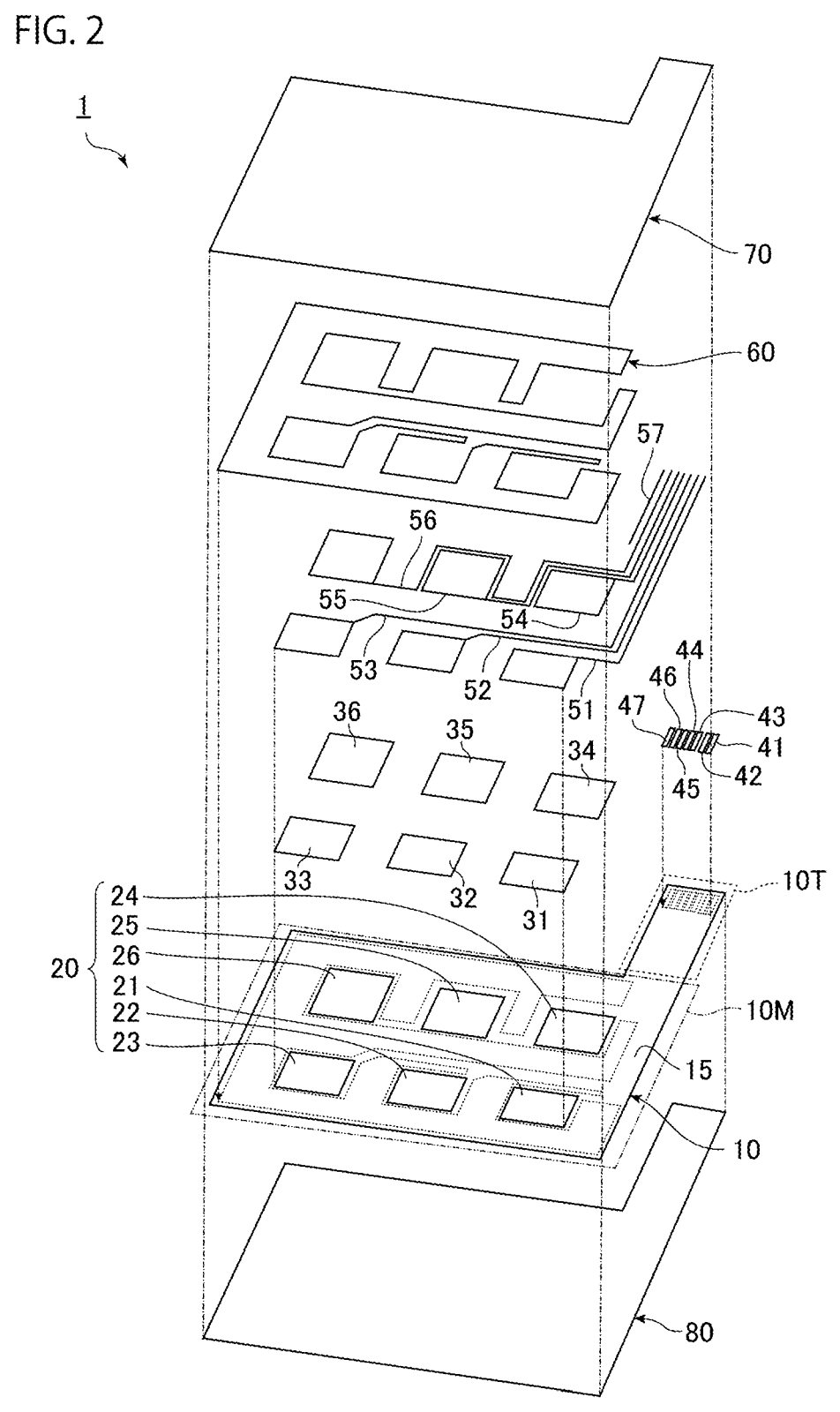
Figure 3:
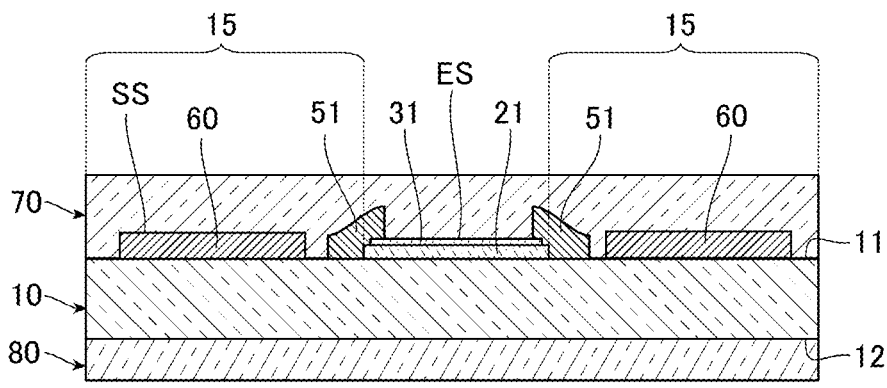
FIG. 3 is a view schematically illustrating a cross section of the capacitance sensor taken along line III-III of FIG. 1.

FIG. 1 is a plan view schematically illustrating a capacitance sensor according to one or more embodiments, FIG. 2 is an exploded perspective view schematically illustrating the capacitance sensor illustrated in FIG. 1, and FIG. 3 is a view schematically illustrating a cross section of the capacitance sensor taken along line III-III of FIG. 1. As illustrated in FIGS. 1 to 3, the capacitance sensor 1 according to one or more embodiments includes a base film 10, a resist layer 20, electrodes 31 to 36, terminals 41 to 47, interconnects 51 to 57, a shield layer 60, an over resist layer 70, and a back resist layer 80. In FIG. 1, the interconnects 51 to 57 are indicated by thick lines.

The base film 10 is a resin film having translucency, insulation, and flexibility. For example, the base film 10 is a film made of a resin such as polyethylene terephthalate (PET), polyethylene naphthalate (PEN), polyimide (PI), polycarbonate (PC), and acrylic (PMMA), and the base film 10 may have a single layer structure or a multilayer structure. The base film 10 has a thickness of, for example, 10 μm or more and 200 μm or less. In one or more embodiments, the base film 10 includes a main portion 10M formed substantially in a rectangular shape, and a strip-shaped tail portion 10T connected to the main portion 10M and elongated in a direction substantially parallel to the shorter direction of the main portion 10M. One short side of the main portion 10M and one long side of the tail portion 10T are located on the same straight line. Note that the shape of the base film 10 is not particularly limited.

The resist layer 20 is a resin layer provided on a part of one main surface 11 of the base film 10, and has translucency, insulation, and flexibility. In FIG. 2, the resist layer 20 is illustrated in a state of being provided on a part of the main surface 11. Adhesion between the resist layer 20 and a predetermined conductive polymer is higher than adhesion between the base film 10 and the predetermined conductive polymer. An example of the predetermined conductive polymer includes poly 3-,4-ethylenedioxythiophene-polystyrene sulfonic acid (PEDOT-PSS). Examples of the resin constituting the resist layer 20 include thermosetting resins such as urethane, polyester, epoxy, and urethane acrylate, ultraviolet curable resins such as acrylate, and thermoplastic resins such as polyethylene in a case where the base film 10 is a single-layer PET film and the predetermined conductive polymer is PEDOT-PSS. The thickness of the resist layer 20 is, for example, 0.5 μm or more and 5 μm or less. The method for evaluating the adhesion is not particularly limited, and examples thereof include a cross-cut test and a scratch test. In addition, the adhesion with the predetermined conductive polymer can be considered to be, for example, substantially the same as the adhesion with a conductive material including the predetermined conductive polymer and constituting the electrodes 31 to 36 described below.

In one or more embodiments, the resist layer 20 includes six portions 21 to 26 separated from each other, and the outer shape of each of the portions 21 to 26 is substantially rectangular. These portions 21 to 26 are arranged in a matrix form so as to be aligned along the shorter direction and the longer direction of the main portion 10M. Each of the portions 21 to 26 is separated from the outer edge of the base film 10, and when viewed along the thickness direction of the base film 10, is surrounded by a region 15 of the main surface 11 of the base film 10 provided with no resist layer 20. Note that the portions 21 to 26 are only required to be surrounded by the region 15, and the shape, number, and arrangement of the portions 21 to 26 are not particularly limited.

The electrodes 31 to 36 are made of a conductive material containing the predetermined conductive polymer, and have translucency. At least a part of each of the electrodes 31 to 36 is provided on a surface of the resist layer 20 opposite to a surface thereof provided with the base film 10. In one or more embodiments, the electrodes 31 to 36 and the portions 21 to 26 correspond one-to-one, and when viewed along the thickness direction of the base film 10, the resist layer 20 and the electrodes 31 to 36 overlap with each other, and each of the electrodes 31 to 36 is surrounded by the region 15. Similarly to the portions 21 to 26, the electrodes 31 to 36 are arranged in a matrix form so as to be aligned along the shorter direction and the longer direction of the main portion 10M. Also, the outer shape of each of the electrodes 31 to 36 is substantially rectangular, and when viewed along the thickness direction of the base film 10, the entireties of the electrodes 31 to 36 are respectively provided on surfaces of the portions 21 to 26 corresponding to the electrodes 31 to 36 opposite to surfaces thereof provided with the base film 10. The conductive material constituting the electrodes 31 to 36 contains the predetermined conductive polymer and a resin that binds the predetermined conductive polymer, and the resin is not particularly limited, but examples thereof include resins such as epoxy, urethane, acrylic, and polyimide. The thickness of each of the electrodes 31 to 36 is, for example, 0.1 μm or more and 3 μm or less. Each of the electrodes 31 to 36 may exceed the area of each of the corresponding portions 21 to 26, so that a part of each of the electrodes 31 to 36 may be provided on the surface of the resist layer 20 opposite to the surface provided with the base film 10, and the other part of each of the electrodes 31 to 36 may be provided on the main surface 11 of the base film 10. In addition, the shape, number, and arrangement of the electrodes 31 to 36 are not particularly limited, and for example, the number of the electrodes 31 to 36 may be one. In this case, for example, the number of the portions constituting the resist layer 20 is one, and at least a part of the electrode is provided on a surface of the portion opposite to a surface thereof provided with the base film 10.

The tail portion 10T of the base film 10 is provided with the terminals 41 to 47. The main surface of the base film 10 on which these terminals 41 to 47 are provided is the main surface 11 on which the resist layer 20 is provided. The terminal 41 and the electrode 31 are electrically connected by the interconnect 51, the terminal 42 and the electrode 32 are electrically connected by the interconnect 52, the terminal 43 and the electrode 33 are electrically connected by the interconnect 53, the terminal 44 and the electrode 34 are electrically connected by the interconnect 54, the terminal 45 and the electrode 35 are electrically connected by the interconnect 55, and the terminal 46 and the electrode 36 are electrically connected by the interconnect 56. In addition, the terminal 47 and the shield layer 60 to be described below are electrically connected by the interconnect 57. In one or more embodiments, as illustrated in FIG. 3, the interconnect 51 covers the entire outer peripheral edge of the electrode 31 to be connected thereto and the entire outer peripheral edge of the portion 21 with which the electrode 31 overlaps. Similarly to the interconnect 51, each of the interconnects 52 to 56 covers the outer peripheral edge of the corresponding one of the electrodes 32 to 36 to be connected thereto and the outer peripheral edge of the corresponding one of the portions 22 to 26 with which the electrodes 32 to 36 overlap. Note that each of the interconnects 51 to 56 does not have to cover the outer peripheral edge of the corresponding one of the electrodes 31 to 36 to be connected thereto and the outer peripheral edge of the corresponding one of the portions 21 to 26 with which the electrodes 31 to 36 overlap.

The shield layer 60 is made of a conductive material, is a layer provided in the region 15 on the main surface 11 of the base film 10, and is separated from the electrodes 31 to 36 and the interconnects 51 to 56. The conductive material constituting the shield layer 60 is not particularly limited, and examples thereof include silver and copper. In one or more embodiments, the shield layer 60 surrounds a large part of the outer periphery of each of the electrodes 31 to 36 when viewed along the thickness direction of the base film 10. Note that the shield layer 60 is only required to be disposed at least at a part of the periphery of each of the electrodes 31 to 36. However, the shield layer 60 is preferably disposed at least at a part between the adjacent electrodes, and more preferably surrounds a range of ¼ or more of the outer periphery of each of the electrodes 31 to 36. The thickness of the shield layer 60 is, for example, 3 μm or more and 20 μm or less. Also, in FIGS. 1 to 3, the shield layer 60 is illustrated in a sheet shape to facilitate understanding, but in one or more embodiments, the structure of the shield layer 60 when viewed along the thickness direction of the base film 10 is a mesh structure in which a plurality of lines overlap in a mesh shape. However, the structure of the shield layer 60 is not particularly limited, and may be a sheet shape.

The over resist layer 70 is a resin layer that covers the electrodes 31 to 36, the interconnects 51 to 57, and the shield layer 60, and has light transmittance, insulation, and flexibility. In one or more embodiments, a part of the tail portion 10T is not covered with the over resist layer 70, and the terminals 41 to 47 are exposed. The resin constituting the over resist layer 70 is not particularly limited, and examples thereof include a similar resin to that for the resist layer 20. The thickness of the over resist layer 70 is, for example, 5 μm or more and 20 μm or less. The resin constituting the over resist layer 70 is preferably the same as the resin constituting the resist layer 20. With such a configuration, as compared with a case where the over resist layer 70 is made of a different resin from the resin constituting the resist layer 20, the difference between the amount of expansion and contraction of the resist layer 20 due to heat and the amount of expansion and contraction of the over resist layer 70 due to heat can be reduced, and cracks caused by expansion and contraction due to heat can be suppressed.

The back resist layer 80 is a resin layer that covers at least a part of a main surface 12 of the base film 10 opposite to the surface provided with the resist layer 20, and has light transmittance, insulation, and flexibility. In one or more embodiments, the back resist layer 80 covers the entire main surface 12. The resin constituting the back resist layer 80 is not particularly limited, and examples thereof include a similar resin to that for the over resist layer 70. The thickness of the back resist layer 80 is, for example, 5 μm or more and 20 μm or less. Note that the resin constituting the back resist layer 80 is preferably the same material as the resin constituting the resist layer 20. According to such a configuration, as compared with a case where the back resist layer 80 is made of a different material from the resin constituting the resist layer 20, the difference between the amount of expansion and contraction of the resist layer 20 due to heat and the amount of expansion and contraction of the back resist layer 80 due to heat can be reduced, and cracks caused by expansion and contraction due to heat can be suppressed.

The capacitance sensor 1 having such a configuration is a so-called self-capacitive capacitance sensor, and is used together with a not-illustrated detection device, for example. Specifically, the terminals 41 to 47 are connected to the detection device, the detection device applies a predetermined voltage to the terminals 41 to 46, and the terminal 47 is connected to the ground. In such a state, for example, when a finger approaches the electrode 31 from the side provided with the over resist layer 70, a pseudo capacitor is formed by the electrode 31 and the finger. The capacitance of the capacitor changes depending on the distance between the electrode 31 and the finger. The detection device detects such a change in capacitance of the pseudo capacitor from, for example, a value for current flowing through each of the terminals 41 to 46. Then, for example, the detection device determines whether or not the finger has come into contact with a portion of the over resist layer 70 overlapping with any of the electrodes 31 to 36 on the basis of whether or not the current value exceeds a threshold value, and outputs a signal indicating the determination result to another device. Such a detection device includes, for example, an integrated circuit such as a microcontroller, an integrated circuit (IC), a large-scale integrated circuit (LSI), and an application specific integrated circuit (ASIC), and a numerical control (NC) device.

Next, a method for producing a capacitance sensor according to one or more embodiments will be described.

Figure 4:
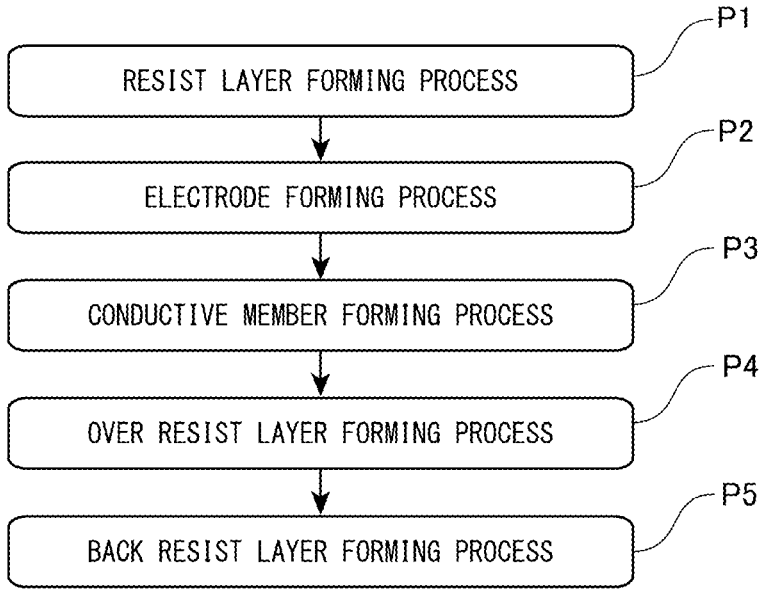
FIG. 4 is a flowchart illustrating processes of a method for producing a capacitance sensor according to one or more embodiments.

FIG. 4 is a flowchart illustrating processes of the method for producing a capacitance sensor according to one or more embodiments. As illustrated in FIG. 4, the method for producing the capacitance sensor 1 according to one or more embodiments includes a resist layer forming process P1, an electrode forming process P2, a conductive member forming process P3, an over resist layer forming process P4, and a back resist layer forming process P5 as main processes.

<Resist Layer Forming Process P1>

This process is a process of preparing the base film 10 having translucency, and applying a resin material having fluidity to a part of one main surface 11 of the base film 10 to form the resist layer 20 having translucency, which has higher adhesion to the predetermined conductive polymer than the base film 10. As a preparation for the base film 10, the base film 10 may be purchased, or the base film 10 may be produced. In this process, the resin material is applied such that the resist layer 20 is surrounded by the region 15 of the main surface 11 of the base film 10 provided with no resist layer 20 when viewed along the thickness direction of the base film 10. The resin material is not particularly limited, and examples thereof include a molten resin obtained by melting a resin to be the resist layer 20, a solution containing a resin to be the resist layer 20 and an organic solvent, and a dispersion liquid containing a resin to be the resist layer 20 and water. The organic solvent is not particularly limited, and examples thereof include iso-phorone, carbitol acetate, butyl carbitol acetate, and terpineol. In one or more embodiments, the resin material is a solution containing a thermosetting resin to be the resist layer 20 and an organic solvent. Then, after the prepared base film 10 is subjected to an annealing treatment, the resin material is applied to a part of one main surface 11 of the base film 10, and the base film 10 to which the resin material has been applied is heated. By doing so, the thermosetting resin in the applied resin material is cured to form the resist layer 20. The method for applying the resin material is not particularly limited, and examples thereof include printing such as gravure printing, offset printing, flexographic printing, and screen printing. Note that most of the organic solvent contained in the resin material volatilizes over time and disappears from the resist layer 20. For example, when the resin material is a molten resin, heating of the base film 10 to which the resin material has been applied is omitted. In a case where the resist layer 20 is made of an ultraviolet curable resin, for example, a resin material which is a solution containing the ultraviolet curable resin to be the resist layer 20 and an organic solvent is applied to a part of the main surface 11 of the base film 10 subjected to the annealing treatment, and the resin material is irradiated with ultraviolet rays. Also, in a case where the resist layer 20 is made of a thermoplastic resin, for example, a resin material which is a solution containing the thermoplastic resin to be the resist layer 20 and an organic solvent is applied to a part of the main surface 11 of the base film 10 subjected to the annealing treatment, and the base film 10 to which the resin material has been applied is cooled.

<Electrode Forming Process P2>

This process is a process of applying the conductive material containing the predetermined conductive polymer to at least a part of the surface of the resist layer 20 opposite to the surface thereof provided with the base film 10 to form the electrodes 31 to 36 having translucency. Here, the adhesion between the predetermined conductive polymer and the resist layer 20 is higher than the adhesion between the predetermined conductive polymer and the base film 10. In this process, the conductive material is applied such that the electrodes 31 to 36 are surrounded by the region 15 when viewed along the thickness direction of the base film 10. In one or more embodiments, the conductive material is applied by printing. The printing method is not particularly limited, and examples thereof include the printing method mentioned in the resist layer forming process P1. In one or more embodiments, the conductive material is an ink containing the predetermined conductive polymer and an organic solvent. The organic solvent is not particularly limited, and examples thereof include the organic solvents mentioned in the resist layer forming process P1. The conductive material is not particularly limited, and may be, for example, an ink in which the predetermined conductive polymer is dispersed in water.

In general, when the base film 10 is subjected to the annealing treatment, oligomers tend to be deposited on the surface of the base film 10. The oligomers are dissolved by the organic solvent contained in the resist layer 20. If the conductive material is applied to the main surface 11 of the base film 10 without forming the resist layer 20, the oligomers are dissolved by the organic solvent contained in the conductive material, but due to the traces of the oligomers, irregularities are formed on the surface of each of the electrodes 31 to 36 provided with the base film 10. In a case where such irregularities are formed or oligomers remain, light is scattered by the irregularities or light is scattered by the oligomers, so that a haze value at a portion overlapping with the electrodes 31 to 36 in the capacitance sensor increases and transparency of the portion may decrease. Therefore, by providing the resist layer 20, it is possible to suppress a decrease in transparency of the portion overlapping with the electrodes 31 to 36 further than in a case of not providing the resist layer 20. From the viewpoint of suppressing such a decrease in transparency, the ratio of the organic solvent contained in the resin material applied to the base film 10 in the resist layer forming process P1 and the ratio of the organic solvent contained in the conductive material are preferably adjusted such that the amount of the organic solvent contained per unit area of the applied resin material is larger than the amount of the solvent contained per unit area of the applied conductive material. By doing so, more oligomers can be dissolved than in the case where the resist layer 20 is not provided.

<Conductive Member Forming Process P3>

This process is a process of forming the terminals 41 to 47, the interconnects 51 to 57, and the shield layer 60, which are conductive members, on the base film 10 on which the electrodes 31 to 36 are formed. In one or more embodiments, the terminals 41 to 47, the interconnects 51 to 57, and the shield layer 60 are formed by printing. The conductive ink used for printing is not particularly limited, and examples thereof include those containing silver or copper as a conductor. The printing method is not particularly limited, and examples thereof include a similar printing method to the printing method for applying the conductive material in the electrode forming process P2.

<Over Resist Layer Forming Process P4>

This process is a process of applying a resin material having fluidity to the base film 10 on which the terminals 41 to 47, the interconnects 51 to 57, and the shield layer 60, which are conductive members, are formed to form the over resist layer 70. The resin material is not particularly limited, and examples thereof include a molten resin obtained by melting a resin to be the over resist layer 70, a solution containing a resin to be the over resist layer 70 and an organic solvent, and a dispersion liquid containing a resin to be the over resist layer 70 and water. The organic solvent is not particularly limited, and examples thereof include those mentioned in the resist layer forming process P1. In one or more embodiments, the resin material is a molten resin obtained by melting a thermosetting resin to be the over resist layer 70, and the resin material is applied so as to cover the interconnects 51 to 57 and the shield layer 60, and the base film 10 to which the resin material is applied is heated. By doing so, the applied resin material is cured to form the over resist layer 70. The method for forming the over resist layer 70 is not particularly limited, and for example, the over resist layer 70 may be formed using printing as in the resist layer forming process P1. In a case where the over resist layer 70 is made of an ultraviolet curable resin, for example, a resin material which is a molten resin obtained by melting the ultraviolet curable resin to be the over resist layer 70 is applied to the base film 10 so as to cover the interconnects 51 to 57 and the shield layer 60, and the resin material is irradiated with ultraviolet rays. In a case where the over resist layer 70 is made of a thermoplastic resin, for example, a resin material which is a molten resin obtained by melting the thermoplastic resin to be the over resist layer 70 is applied to the base film 10 so as to cover the interconnects 51 to 57 and the shield layer 60, and the base film 10 to which the resin material is applied is cooled.

<Back Resist Layer Forming Process P5>

This process is a process of applying a resin material having fluidity to the base film 10 on which the over resist layer 70 is formed to form the back resist layer 80. The resin material is not particularly limited, and examples thereof include a molten resin obtained by melting a resin to be the back resist layer 80, a solution containing a resin to be the back resist layer 80 and an organic solvent, and a dispersion liquid containing a resin to be the back resist layer 80 and water. The organic solvent is not particularly limited, and examples thereof include those mentioned in the resist layer forming process P1. In one or more embodiments, the resin material is a molten resin obtained by melting a thermosetting resin to be the back resist layer 80, and the resin material is applied to the main surface 12 of the base film 10 opposite to the surface provided with the resist layer 20, and the base film 10 to which the resin material is applied is heated. By doing so, the applied resin material is cured to form the back resist layer 80. The method for forming the back resist layer 80 is not particularly limited, and for example, as in the resist layer forming process P1, the back resist layer 80 may be formed by printing. In a case where the back resist layer 80 is made of an ultraviolet curable resin, for example, a resin material that is a molten resin obtained by melting the ultraviolet curable resin to be the back resist layer 80 is applied to the main surface 12 of the base film 10, and the resin material is irradiated with ultraviolet rays. In a case where the back resist layer 80 is made of a thermoplastic resin, for example, a resin material which is a molten resin obtained by melting the thermoplastic resin to be the back resist layer 80 is applied to the main surface 12 of the base film 10, and the base film 10 to which the resin material is applied is cooled. The flow of the method for producing the capacitance sensor 1 is not particularly limited. For example, the over resist layer forming process P4 may be performed after the back resist layer forming process P5.

As described above, the capacitance sensor 1 according to one or more embodiments includes the base film 10 having translucency, the resist layer 20 having translucency, and the electrodes 31 to 36 having translucency. The resist layer 20 is provided on a part of one main surface 11 of the base film 10, and, the adhesion between a predetermined conductive polymer and the resist layer 20 is higher than the adhesion between the predetermined conductive polymer and the base film 10. The electrodes 31 to 36 are made of a conductive material containing the predetermined conductive polymer, and at least a part of each of the electrodes 31 to 36 is provided on a surface of the resist layer 20 opposite to a surface thereof provided with the base film 10. When viewed along the thickness direction of the base film 10, the region 15 of the main surface 11 of the base film 10 provided with no resist layer 20 surrounds each of the electrodes 31 to 36.

Also, the method for producing the capacitance sensor 1 according to one or more embodiments includes the resist layer forming process P1 and the electrode forming process P2. The resist layer forming process P1 is a process of applying a resin material to a part of the main surface 11 of the base film 10 having translucency to form the resist layer 20 having translucency, which has higher adhesion to the predetermined conductive polymer than the base film 10. In this resist layer forming process P1, the resin material is applied such that, when viewed along the thickness direction of the base film 10, the resist layer 20 is surrounded by the region 15 of the main surface 11 of the base film 10 provided with no resist layer 20. The electrode forming process P2 is a process of applying a conductive material containing a predetermined conductive polymer to at least a part of a surface of the resist layer 20 opposite to a surface thereof provided with the base film 10 to form the electrodes 31 to 36 having translucency. In this electrode forming process P2, the conductive material is applied so that each of the electrodes 31 to 36 is surrounded by the region 15 when viewed along the thickness direction of the base film 10.

In the capacitance sensor 1 and the method for producing the capacitance sensor 1 according to one or more embodiments, at least a part of each of the electrodes 31 to 36 having translucency is attached to the base film 10 via the resist layer 20. The adhesion between the predetermined conductive polymer contained in the conductive material constituting the electrodes 31 to 36 and the resist layer 20 is higher than the adhesion between the predetermined conductive polymer and the base film 10. Therefore, as compared with a case where the resist layer 20 is not provided on the base film 10, the adhesion between each of the electrodes 31 to 36 and the base film 10 can be enhanced. Also, in the capacitance sensor 1 and the method for producing the capacitance sensor 1 according to one or more embodiments, when viewed along the thickness direction of the base film 10, the region 15 of the main surface 11 of the base film 10 provided with no resist layer 20 surrounds each of the electrodes 31 to 36. Therefore, with the capacitance sensor 1 according to one or more embodiments, as compared with a case where the resist layer 20 is provided on the entire surface of the main surface 11 of the base film 10, it is possible to suppress a decrease in flexibility at least around each of the electrodes 31 to 36, and it is possible to improve attachability to a curved portion in a device or the like. Further, with the method for producing the capacitance sensor 1 according to one or more embodiments, it is possible to produce the capacitance sensor 1 capable of suppressing a decrease in flexibility while increasing adhesion of the electrodes 31 to 36.

Also, the capacitance sensor 1 according to one or more embodiments further includes the shield layer 60 provided in the region 15 and separated from the electrodes 31 to 36. Therefore, as compared with a case where the capacitance sensor 1 does not include the shield layer 60, it is possible to suppress an influence of an external electromagnetic field or the like on the electrodes 31 to 36.

In one or more embodiments, as illustrated in FIG. 3, the shield layer 60 is thicker than each of the electrodes 31 to 36. Therefore, as compared with a case where the shield layer 60 is thinner than each of the electrodes 31 to 36, the difference between the total thickness of each of the electrodes 31 to 36 and the resist layer 20 and the thickness of the shield layer 60 can be reduced. Therefore, as compared with a case where the shield layer 60 is thinner than each of the electrodes 31 to 36, the amount of unevenness of a surface of the capacitance sensor 1 on a side of the electrodes 31 to 36 with reference to the base film 10 can be reduced.

In one or more embodiments, the entirety of each of the electrodes 31 to 36 and a part of the shield layer 60 overlap with each other in a direction along the main surface 11 of the base film 10. Therefore, as compared with a case where each of the electrodes 31 to 36 and the shield layer 60 do not overlap with each other in the direction along the main surface 11, it is possible to suppress an influence of an electromagnetic field or the like in the direction along the main surface 11 on the electrodes 31 to 36. From the viewpoint of suppressing the influence of the electromagnetic field or the like in the direction along the main surface 11 on the electrodes 31 to 36, at least a part of each of the electrodes 31 to 36 and a part of the shield layer 60 are only required to overlap with each other in this direction. In one or more embodiments, the thickness of the shield layer 60 is larger than the total thickness of the resist layer 20 and each of the electrodes 31 to 36, and a surface SS of the shield layer 60 opposite to a surface thereof provided with the base film 10 is located on the opposite side of the side of the base film 10 with reference to a surface ES of each of the electrodes 31 to 36 opposite to a surface thereof provided with the resist layer 20. Therefore, as compared with a case where the surface SS of the shield layer 60 is located on the side of the base film 10 with reference to the surface ES of each of the electrodes 31 to 36, it is possible to further suppress the influence of the electromagnetic field and the like on the electrodes 31 to 36. In addition, with such a configuration, as compared with the case described above, in the surface of the capacitance sensor 1 on the side of the electrodes 31 to 36 with reference to the base film 10, a portion overlapping with each of the electrodes 31 to 36 can be inhibited from protruding in a raised form outward, and lowering of durability can be suppressed.

In one or more embodiments, the base film 10 includes the main portion 10M provided with the resist layer 20, and the tail portion 10T connected to the main portion 10M and provided with the terminals 41 to 46 electrically connected to the electrodes 31 to 36. One main surface of the base film 10 in the tail portion 10T is included in the region 15. For this reason, the resist layer 20 is not provided in the tail portion 10T. Therefore, with the capacitance sensor 1 according to one or more embodiments, as compared with a case where the resist layer 20 is provided in the tail portion 10T, it is possible to suppress a decrease in flexibility of a portion including the tail portion 10T in the capacitance sensor 1, and it is possible to easily arrange the terminals 41 to 46 at desired positions. Note that the resist layer 20 may be provided in at least a part of the tail portion 10T of the base film 10.

The present invention has been described above by taking one or more embodiments as an example, and the present invention is not limited to the embodiments.

For example, in the above embodiments, the capacitance sensor 1 including the shield layer 60 has been described as an example. However, the capacitance sensor 1 does not have to include the shield layer 60. Also, the shield layer 60 may be provided on the main surface 12 of the base film 10 opposite to the surface thereof provided with the resist layer 20. In this case, the shield layer 60 is provided in a region of the main surface 12 overlapping with the region 15 when viewed along the thickness direction of the base film 10, and is covered with the back resist layer 80. Also, the shield layer 60 is separated from the electrodes 31 to 36 when viewed along the thickness direction of the base film 10.

In the above embodiments, the shield layer 60 thicker than each of the electrodes 31 to 36 has been described as an example. However, the shield layer 60 may be made thinner than each of the electrodes 31 to 36, and each of the electrodes 31 to 36 and the shield layer 60 do not have to overlap with each other in the direction along the main surface 11 of the base film 10.

In the above embodiments, the capacitance sensor 1 including the back resist layer 80 has been described as an example. However, the capacitance sensor 1 does not have to include the back resist layer 80.

In the above embodiments, the self-capacitive capacitance sensor 1 has been described as an example. However, the capacitance sensor 1 may be a mutual-capacitive capacitance sensor. An example of such a capacitance sensor include one having a configuration in which the electrode 31 is divided into two, a first electrode and a second electrode arranged to be spaced from each other in a direction along the main surface 11 of the base film 10 are formed, and a terminal electrically connected to the first electrode and another terminal electrically connected to the second electrode are provided instead of the terminal 41.

As described above, according to one or more embodiments, provided are a capacitance sensor capable of suppressing a decrease in flexibility while increasing adhesion of an electrode, and a method for producing a capacitance sensor, which can be used in the fields of an operation switch for a vehicle, a touch panel display, and the like. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A capacitance sensor comprising:
   a translucent base film;
   a translucent resist layer disposed on a part of a main surface of the translucent base film and having higher adhesion to a conductive polymer than to the translucent base film; and
   a translucent electrode including a conductive material containing the conductive polymer and disposed on a placement surface of the translucent resist layer opposite to a surface of the translucent resist layer on which the translucent base film is disposed, wherein
   when viewed along a thickness direction of the translucent base film, a region of the main surface of the translucent base film where the translucent resist layer is not disposed surrounds the translucent electrode,
   an entirety of the translucent electrode is disposed on the placement surface, and
   in a plan view of the capacitance sensor, an outer peripheral edge of the translucent electrode is disposed closer to a center of the translucent electrode than is an outer peripheral edge of the translucent resist layer.

2. The capacitance sensor according to claim 1, further comprising:
   a shield layer disposed in the region and separated from the translucent electrode.

3. The capacitance sensor according to claim 2, wherein the shield layer is thicker than the translucent electrode.

4. The capacitance sensor according to claim 3, wherein the translucent electrode overlaps a part of the shield layer in a direction along the main surface of the translucent base film.

5. The capacitance sensor according to claim 1, wherein the translucent base film includes:
   a main portion in which the translucent resist layer is disposed; and a tail portion connected to the main portion and in which a terminal electrically connected to the translucent electrode is disposed, and the region includes the main surface of the translucent base film in the tail portion.

6. A method for producing a capacitance sensor, comprising:

applying a resin material to a part of a main surface of a translucent base film to form a translucent resist layer having higher adhesion to a conductive polymer than to the translucent base film; and forming a translucent electrode by applying a conductive material containing the conductive polymer to a placement surface of the translucent resist layer opposite to a surface of the translucent resist layer on which the translucent base film is disposed, wherein in forming the translucent resist layer, the resin material is applied such that, when viewed along a thickness direction of the translucent base film, a region of the main surface of the translucent base film where the translucent resist layer is not disposed surrounds the translucent resist layer, in forming the translucent electrode, the conductive material is applied such that, when viewed along the thickness direction, the region surrounds the translucent electrode, in forming the translucent electrode, the conductive material is applied such that an entirety of the translucent electrode is disposed on the placement surface, and in a plan view of the capacitance sensor, an outer peripheral edge of the translucent electrode is disposed closer to a center of the translucent electrode than is an outer peripheral edge of the translucent resist layer.

7. The capacitance sensor according to claim 1, further comprising:

an interconnect covers an entirety of the outer peripheral edge of the translucent electrode and an entirety of the outer peripheral edge of the translucent resist layer.

8. The method according to claim 6, further comprising:

forming an interconnect by applying a conductive material to cover an entirety of the outer peripheral edge of the translucent electrode and an entirety of the outer peripheral edge of the translucent resist layer.

9. The capacitance sensor according to claim 1, further comprising:

a translucent over resist layer covering the translucent electrode and including a resin that is same as a resin in the translucent resist layer.

* * * * *